United States Patent [19]
Blaze

[11] Patent Number: 5,574,781
[45] Date of Patent: Nov. 12, 1996

[54] TRANSLATION INDICATOR FOR DATABASE-QUERIED COMMUNICATIONS SERVICES

[75] Inventor: Matthew A. Blaze, Jersey City, N.J.

[73] Assignee: AT&T, Holmdel, N.J.

[21] Appl. No.: 351,918

[22] Filed: Dec. 8, 1994

[51] Int. Cl.⁶ .......................... H04M 3/00; H04M 7/00
[52] U.S. Cl. .................... 379/220; 379/230; 379/201; 379/247
[58] Field of Search ........................... 379/265, 266, 379/309, 201, 207, 127, 243, 245, 246, 447, 229, 230

[56] References Cited

U.S. PATENT DOCUMENTS

| | | | |
|---|---|---|---|
| 4,551,581 | 11/1985 | Doughty | 379/142 |
| 4,763,191 | 8/1988 | Gordon et al. | 358/86 |
| 4,805,209 | 2/1989 | Baker, Jr. et al. | 379/96 |
| 4,852,154 | 7/1989 | Lewis et al. | 379/105 |
| 4,987,587 | 1/1991 | Jolissaint | 379/94 |
| 5,103,449 | 4/1992 | Jolissaint | 379/127 |
| 5,163,087 | 11/1992 | Kaplan | 379/94 |
| 5,181,239 | 1/1993 | Jolissaint | 379/96 |
| 5,200,994 | 4/1993 | Sasano et al. | 379/142 |
| 5,289,542 | 2/1994 | Kessler | 379/201 |
| 5,311,572 | 5/1994 | Friedes et al. | 379/67 |

Primary Examiner—Krista M. Zele
Assistant Examiner—Daniel S. Hunter
Attorney, Agent, or Firm—Henry T. Brendzel

[57] ABSTRACT

A communications system is arranged to route a database-queried call (900-number or 800-number call) to a subscriber (pay-per-call sponsor or 800-number customer), and to deliver to the subscriber information identifying the call as a database-queried call, as opposed to a switched-line or POTS call.

16 Claims, 3 Drawing Sheets

5,574,781

TRANSLATION INDICATOR FOR DATABASE-QUERIED COMMUNICATIONS SERVICES

TECHNICAL FIELD

This invention relates to voice and data communications and, more particulary, to a system for preventing fraud for database-queried communications services.

BACKGROUND OF THE INVENTION

Communications carries provide database-queried communications services to their subscribers by using database management information system techniques to implement special call pressing functions. Those functions include billing and call routing services which allow a subscriber to concentrate on providing the actual information content for the database-queried communications services offered. One example of such communications services is 800-number service, also known as "freephone service", in which communications carriers translate 800-numbers numbers dialed by callers to switched-line numbers to which the calls are routed. The communication carriers also bill 800-number subscribers for all 800-number calls placed by callers. Another well-known example of database-queried communications service is 900-number service, in which communications carriers, acting as billing agents for the 900-number subscribers (hereinafter called "sponsors"), bill callers for both the 900-number calls placed by those callers and the underlying information services received with those calls.

Traditionally, 800-number subscribers and 900-number sponsors have been primarily medium-and large-scale services providers who use leased lines and specialized communications equipment (such as PBX switches and automated audio response units) at their presses to receive calls from their customers. In the case of 900-number services (also known as "pay-per-call" services), those companies offer information serices ranging from stock quotes to sports scores. Those information services are provided by either operators at the sponsors' locations answering callers questions or by the automated audio response units which deliver recorded messages to callers in response to prompts entered by the callers to select desired information services.

A recent trend— one that is likely to continue— in the pay-per-call market is for trained professslongs to use pay-per-call services to provide to callers one-on-one consultation services and advice on a wide range of matters, such as health, law, insurance, and help desk service for widely used software programs to name a few. Those sponsors are typically small-scale enterprises that use simple telephone sets or keysets and individual switched lines from Local Exchange Carders (LECs). Analog switched services are sometimes called Plain Old Telephone Service or POTS for short. Typically, the communications carrier translates the pay-per-call number dialed by the caller to the switched line number to which the call is directed.

Pay-per-call services in general, and switched-line-based termination for 900-number service, in particular raise some serious security concerns. Because sponsors have no way of knowing whether incoming calls were placed via 900 numbers or were placed directly to the terminating switched line numbers, sponsors are vulnerable to theft of service by callers who simply learn and dial the switched line number to which the 900 numbers are translated. For future 900-number based services, such as video services and electronic payment systems, theft of those services is likely to cause great economic harm to the sponsors.

Equally significant is the fact that some 800-number service subscribers can also benefit from knowing whether a call is an 800-number call or a POTS call. For example, an 800number subscriber who has one or more switched line numbers to which 800-number calls are directed, may wish to provide different call treatment to 800-number callers than is offered to POTS callers. Unfortunately, the 800-number subscriber cannot differentiate 800-number callers from POTS callers.

Thus, a problem of the prior art is lack of a) an indicator to differentiate database-queried communications services from other communications services, and b) lack of fraud prevention mechanisms for 900-number service.

SUMMARY OF THE INVENTION

The present invention is directed to a system which routes a database-queried call (900-number or 800-number call) to a subscriber (pay-per-call sponsor or 800-number customer), and delivers to the subscriber information identifying the call as a database-queried call, as opposed to a switched-line or POTS call.

In an embodiment of the principles of the invention, when a communications carrier translates an 800-number or 900-number dialed by a caller to a switched-line or POTS number, the carrier inserts in the calling party number field translation indicator data that is passed to the subscriber. The translation indicator data may be one or more digits forming a code indicating to the sponsor that the call is indeed an 800- or 900-number call. When the switched line serving the receiving telephone set is a POTS line, the translation indicator data may be passed in-band (e.g. between the first and second ring) for display on a monitor, such as the AT&T Call Display 25. Alternatively, the translation indicator data may be delivered as an audible signal to the telephone set for which the call is destined.

In another embodiment of the invention, the translation indicator data is cryptographically authenticated and delivered to the subscriber as part of user information data routed via a signaling channel of the digital switched line serving the subscriber. For example, the authenticated translation indicator data may be a binary representation of the time and date of the call and the calling party number. Upon receiving the translation indicator data, private-key cryptographic techniques are used by the sponsor to authenticate the translation indicator data. Alternatively, public-key signatures may be used to sign and authenticate the translation indicator data.

At a more general level, the present invention allows a subscriber of a communications service to provide that service to a user only if the subscriber receives specific information indicating that the address selected by the user to request the service is different from the address at which the request was received by the subscriber.

DETAILED DESCRIPTION

Figure 1:
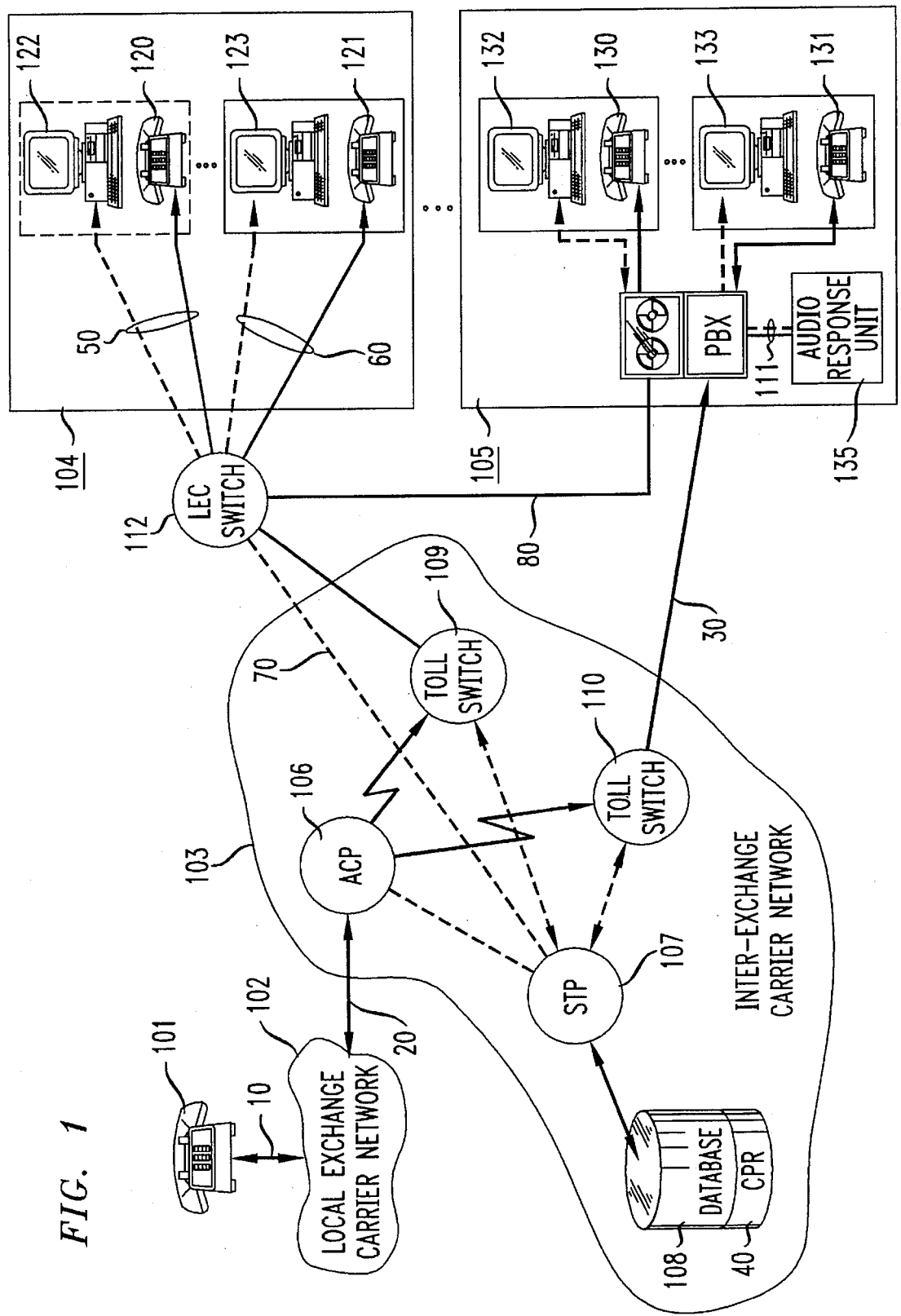
FIG. 1 shows in block diagram form an illustrative configuration of a telecommunications network designed to route database-queried calls, and to deliver to subscribers information identifying those calls as database-queried calls.

Shown in FIG. 1 is a block diagram of a telecommunications network which includes a Local Exchange Carrier (LEC) network 102, an Interexchange Carrier (IXC) network 103 and two 900-number sponsor locations 104 and 105. When a caller at station set 101 places a 900-number call destined for a pay-per-call sponsor at location 104 or 105, the call is routed to LEC network 102 via line 10. Local Exchange Carrier (LEC) 102 is comprised of telephone switching and signaling systems which are interconnected by transmission lines and which are arranged to route calls to appropriate destinations indicated by the telephone numbers dialed to initiate those calls. LEC network 102 may also include routing databases and other adjunct processors connected to the switching or signaling systems.

Upon determining (through a database lookup operation) that the 900 number call is destined for a subscriber of IXC 103, LEC network 102 forwards the dialed digits and the calling party number to ACtion Point (ACP) 106 via a channel of trunk 20. ACP 106 is the point of entry for all traffic originating from LEC network 102 and destined for subscribers of interexchange carrier network 103. ACP 106 also serves as the access point to a signaling network which is a packet switching network comprised of interconnected nodes called "Signal Transfer Points" (STP) that are used to exchange call handling messages between ACP 106, database 108, and toll switches 109 and 110 according to a specific protocol, such as CCS7. For the sake of simplicity, the signaling network is represented in FIG. 1 by a single Signal Transfer Point (STP) 107. U.S. Pat. No. 4,611,094 issued on Sep. 9, 1986 to R. L. Asmuth, et al. provides a general description of an ACP. The features and functionality of an STP are described in the book "Engineering and Operations in the Bell System", Second Edition, published by AT&T Bell Laboratories, at pages 292 through 294. In addition, a detailed description of CCS7ISDN User Part standards can be found in ANSI document T1. 113-1988 or the BellCore document TA-NWT-000394 titled "Switching Systems Requirements for Interexchange Carder Interconnection Using the ISDN User Part".

Upon receiving the dialed number and the calling party number, ACP 106 uses that information to launch a query on the signaling network (STP 107) to retrieve from database 108 a Call Processing Record (CPR), such as CPR 40. Database 108 is a repository of information that is used to formulate routing instructions for a 900-number call. Information stored in database 108 includes routine and subroutine logic, routing tables, and records of routing information for each 900-number sponsor.

Figure 2:
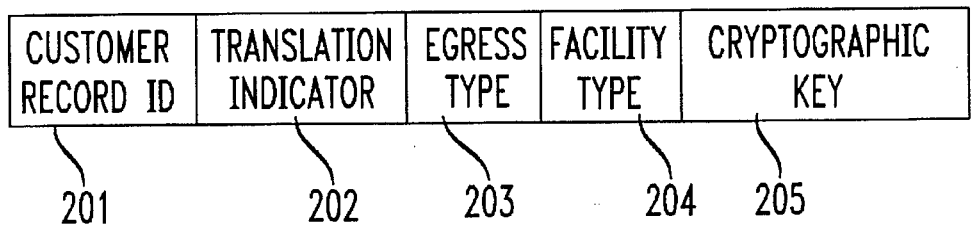
FIG. 2 is a layout of some of the fields in a Call Processing Record that is used to formulate routing instructions for database-queried calls directed to subscribers.

Call Processing Record (CPR) 40 is an illustrative representation of such a record. For the sake of simplicity, a subset of the fields in CPR 40 most relevant to the invention is provided in FIG. 2. Customer Record Identification 201 uniquely identifies a sponsor within database system 108. Typically, customer record identification 201 is the 900-prefixed number dialed by the caller. Translation indicator 202 is a field that is used to determine whether the sponsor has subscribed to a service that allows the sponsor to receive data indicating whether the caller dialed a 900 number.

Egress type 203 identifies the egress arrangement implemented at the sponsor's destination location. Alternatively, egress type 203 may point to the type of services to which a sponsor has subscribed. For a subscriber of AT&T 900number services for example, the content of the service type field may indicate whether the sponsor has subscribed to Dial-it, a switched egress arrangement service, or to Express 900, a dedicated egress arrangement service. Egress arrangements typically fall into two distinct categories, namely, dedicated and switched egress arrangements. An exemplary illustration of a dedicated egress arrangement is shown in FIG. 1 where Private Branch Exchange (PBX) 111 at call center 105 is directly connected to terminating toll switch 110 of the IXC network 103 via a trunk 30. Similarly, an exemplary illustration of switched egress arrangement is shown in FIG. 1 where telephone sets 120 and 121 at call center 104 are connected to a LEC switch 112 via lines 50 and 60.

For a dedicated egress arrangement, facility type 204 indicates whether Integrated Services Digital Network (ISDN) Primary Rate Interface (PRI) standards are implemented for transmission of information over trunk 30. One of the key attributes of the ISDN PRI standard is the support for twenty-four 64 Kbps channels over a standard DS-1 facility. Of particular importance is the aspect of the standard that requires the use of twenty three of those channels to carry voice or data information and one common channel to exclusively carry signaling information for the other twenty-three channels. The signaling channel can be used, for instance, to carry user information, such as calling party number, calling party name, and other types of information associated with a call. Additional information regarding ISDN standards in general, and PRI interface in particular, can be found in AT&T Technical Journal, Vol. 65, No. 6, Issue 1, pp. 1–55 January /February 1986.

For a switched egress arrangement, facility type 204 indicates whether lines 50 and 60 are analog POTS lines, or ISDN Basic Rate Interface (BRI) lines. One of the key attributes of the ISDN BRI standard is the support of two 64 Kbps bearer channels and one 16 Kbps data channel over a standard two-wire or four-wire facility. The data channel may be used, for example, to carry user information, such as calling party name, and other information associated with the call. For more information on BRI interface see AT&T Technical Journal, Vol. 65, No. 6, Issue 1, pp. 5–17 January/ February 1986. Facility type 204 also indicates whether Common Channel Signaling 7 Network Interconnect (CCS7-NI) is implemented on LEC switch 112. As is well known in the art, CCS7-NI is an integrated signaling feature that allows a LEC switch to receive and pass to any of its ISDN stations signaling information received from another network, such as an IXC network. Thus, in this example, when CCS7-NI is implemented on a communication path that originates from STP 107, traverses LEC switch 112 and includes multiple sections such as line 70, and line 50 or 60. IXC network 103 may send signaling information to telephone sets 120 and 122 via LEC switch 112.

Optionally, CPR 40 may include cryptographic key 205 which is a secret key that is used to encode translation indicator data delivered to a sponsor. The key allows the sponsor to verify that the translation indicator data was indeed originated by the carrier, as described in further detail below. When translation indicator data is encrypted, IXC 103 uses a cryptographic file system, such as the UNIX-based CFS that may be implemented, for example, in database 108 or in another processor of IXC 103.

Figure 3:
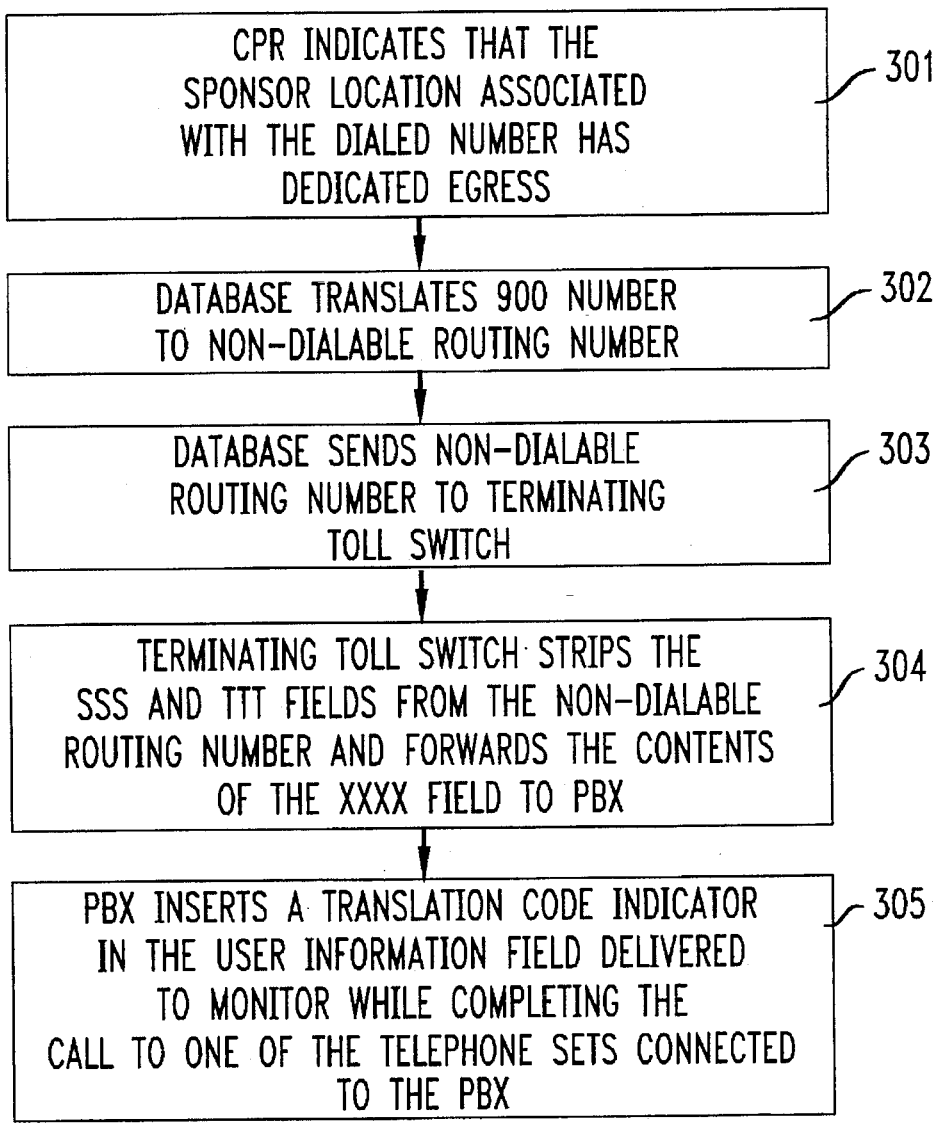
FIGS. 3 and 4 are flow diagrams of call processing instructions executed by some components of the network of FIG. 1 to implement the principles of the invention.

FIG. 3 outlines an illustrative step-by-step method for delivering translation indicator data to a dedicated egress location of a sponsor. This method begins in step 301 when the content of the egress type field 203 in Customer Processing Record (CPR) 40 indicates that the sponsor associated with the dialed number has a dedicated egress arrangement at the destination call center 105. As indicated in step 302, database 108 translates the 900 number dialed by the caller to a non-dialable routing number which is in the format SSS-TTT-XXXX. The non-dialable routing number is an internal routing number identifiable only to the switches of the interexchange carrier's network. In the non-dialable routing number, SSS represents a number identifying the terminating toll switch 110, and TIT is an identification number for the trunk subgroup associated with trunk 30 which connects PBX 111 to toll switch 110. The XXXX code in the non-dialable routing number permits a sponsor with multiple 900-numbers in the same routing arrangement to identify the specific 900-number dialed by a caller. Database 108 proceeds in step 303, to send the non-dialable routing number and the calling party number via STP 107 to ACP 106 which promptly transmits same to terminating toll switch 110. The latter, in step 304, strips the SSS and TTT fields from the non-dialable routing number and forwards the contents of the XXXX field and the calling party number to PBX 111 via the signaling channel of trunk 30. In step 305, PBX 111 inserts a translation indicator code in either the calling party number field or the user information field for delivery to one of the monitors 132 or 133 at the sponsor location 105 while PBX 111 completes the call to telephone set 130 or 131. When the call is completed to an audio response unit 135, the latter does not prompt the caller for information until the translation indicator code has been received from PBX 111. Advantageously, audio response unit 135 can deliver different greetings to callers based on whether the translation indicator was received.

It should be appreciated that PBX 111 in FIG. 1 is directly connected to both terminating toll switch 110 (via trunk 30) and LEC switch 112 via trunk 80. Accordingly, PBX 111 can receive 900-number calls from IXC 103 and POTS calls from LEC switch 112. Hence, while PBX 111 can always ascertain whether an incoming call is a POTS call or a database-queried call (identified by the XXXX format for the call), attendants at telephones sets 130 and 131 can make such a determination only if the translation indicator data (mentioned above) is displayed to them. The translation indicator data can be a code of one or more alphanumeric characters pre-pended to the calling party number, if available. Alternatively, the translation indicator data can be a message displayed on monitor 132 or 133.

Figure 4:
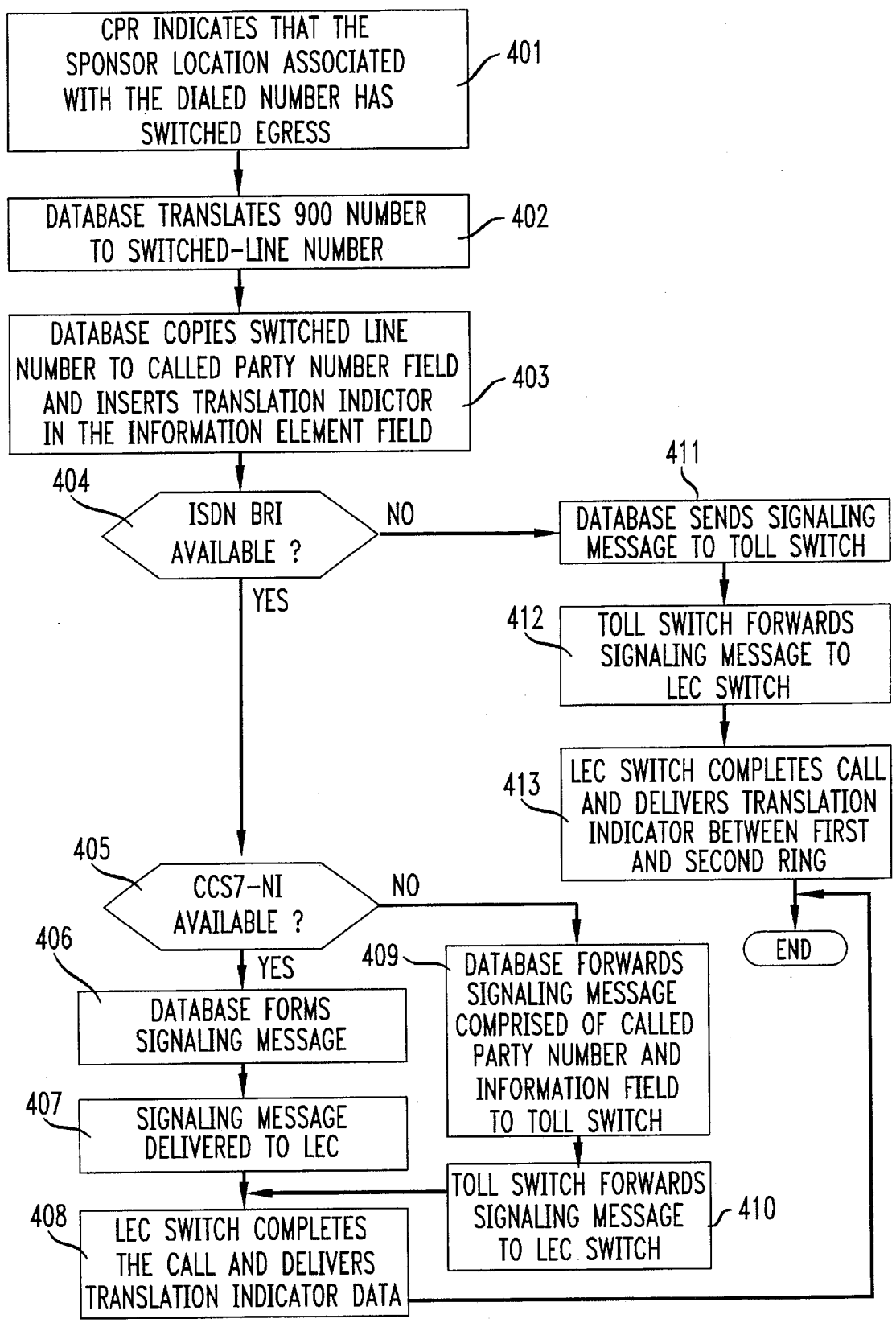

FIG. 4 illustrates a step-by-step method to deliver translation indicator information to a sponsor who has a switched egress arrangement at the destination location. This method begins in step 401 when the content of egress type field 203 in Customer Processing Record (CPR) 40 indicates that the sponsor associated with the dialed number has a switched egress arrangement at the destination location. As indicated in step 402, database 108 translates the 900-number dialed by the caller to a switched-line number or POTS number associated with a telephone set at the sponsor's location. The translated number is in the format NPA-NXX-XXX where NPA is the area code of the sponsor's location, NXX is the exchange number for that location and XXXX identifies a particular line for that exchange number. In step 403, database 108 copies the translated number in the called party number field and inserts translation indicator data in the Information Element (IE) field, for example. A determination is made in step 404 (using field 204) as to whether line 50 (60) is an ISDN BRI facility. If so, a further test is made in step 405 to determine whether CCS7-NI is implemented on LEC switch 112. If so, database 108, in step 406, forms a signaling message comprised of the called party number and the information element field in which translation indicator data is inserted. The signaling message is delivered, in step 407, to LEC switch 112 while the call is routed to LEC switch 112 via ACP 106 and toll switch 109. In step 408, LEC switch 112 completes the call to telephone set 121, for example, over one of the bearer channels of line 60, while LEC switch 112 delivers the translation indicator data to monitor 123 over the data channel of line 50. If CCS7-NI is not available, as determined in step 405, database 108, in step 409, forwards the signaling message formed by the called party number field and the information element field (containing the translation indicator) to terminating toll switch 109 via STP 107 while the call is routed to toll switch 109 by ACP 106. In step 410, terminating toll switch 109 forwards a CCS7 Initial Address Message (IAM) to LEC switch 112 with NPA-NXX-XXXX as the called party number and the translation indicator as the information element field. LEC switch 112 then completes the call to station set 123 over a bearer channel of line 60 and delivers the translation indicator data to monitor 123 over a data channel of line 60 as indicated in step 408.

When lines 50 and 60 are ISDN BRI lines, significant amount of information can be delivered over the signaling channel of those lines. Accordingly, the translation indicator data can be encrypted by the IXC 103 and decrypted at monitor 122 or 123 which is (in this case) coupled to a processor. Two possible encrypting and decrypting schemes may be used, namely a private key scheme and a public key scheme.

In a private key scheme, a cryptographic function AUTH denoted AUTH(msg,key) is defined. The function returns a small constant number of bits (typically between 64 and 160), called a "hash", based on the arbitrary length message "msg" and a fixed length "key". The defined AUTH function must have several properties. Those properties include infeasibility of a) calculating the key from the value of AUTH(msg,key), b) calculating AUTH(msg,key) without knowledge of all the bits of both msg and key, and c) generating a new correct value of AUTH(msg,key) for some other value of msg not in the original set, even given a (possibly large) number of AUTH(msg,key) values and corresponding msg values for each, but not the value of key. Several existing functions are believed to have these properties, including the well known DES-MAC, keyed MD5 and keyed SHA.

To cryptographically authenticate the translation indicator forwarded by IXC 103 to sponsor location 104, IXC 103 and the sponsor at location 104 must agree, in advance, on a unique key which they must each keep secret. The translation indicator (I) is selected such that it is guaranteed to be for each call a distinctive string of data easily recognizable as unique when displayed on a monitor. For example, a binary representation of a) the time and date of the call, and b) the calling party number may be used for this purpose.

When processing a 900-number call for a particular sponsor, IXC 103 retrieves from CPR 40 the sponsor's secret cryptographic key and calculates AUTH(I,key) for the call using prior art cryptographic techniques. IXC 103 then sends a signaling message comprised of a SETUP message for the call, the message I, and AUTH(I,key) data to LEC switch 102. The latter forwards the AUTH(I,key) data to monitor 121, for example over the data channel of line 60, and completes the call to telephone set 121 over the bearer channel. To confirm that the translation indicator authenticator (e.g., AUTH(I,key)) is in fact valid and originated by IXC 103, monitor 123 first verifies that the indicator contains a valid date, and then calculates AUTH(I,key) itself and compares it with the value received. If the values match, the translation indicator is authentic and the call is be processed accordingly.

Alternatively, public-key based schemes may be used for cryptographic translation indicator authenticator data. In this case, the AUTH function is replaced by a public key digital signature (e.g., RSA or DSA). The public key function has the advantage that the verification key can be public and need not be different for IXC 103 and. LEC switch 112. With a public key scheme, IXC 103 has a single signature key used for all the sponsors subscribing to its services. Thus, there is no need to share a secret key with the sponsors. However, in public key schemes, the translation indicator authenticator may require between 512 and 2048 bits of additional data in the stream of data delivered to monitor 123.

Returning to FIG. 4, when ISDN BRI standards are not implemented on line 50 or 60, as determined in step 404, database 108, in step 411, formulates routing instructions that include the called party number and translation indicator data that are delivered to terminating toll switch 109 via STP 107. Terminating toll switch 109, in step 412, forwards the routing instructions to LEC switch 112 which a) completes the call over line 50 in step 413, to telephone set 120 and b) delivers the translation indicator data to monitor 122 between the first and second ring for the call, as is currently done for caller id information delivered over analog facilities using ground start/loop start protocol. Alternatively, IXC 103 may deliver the translation indicator data to telephone set 120 by applying to that telephone set an audible signal recognizable as an indicia of translation by an attendant answering calls at telephone set 120.

Advantageously, the invention allows pay-per-call sponsors to block calls when the translation indicator is not received at the sponsor's location. For example, a busy tone or a short announcement may be delivered to a switched-line caller when the translation indicator is not received with the call. Conversely, 800-number subscribers may wish to provide different call treatments to 800-number callers than are offered to switched-line-number or POTS-number callers.

The foregoing is to be construed as only being an illustrative embodiment of the principles of this invention. Persons skilled in the art can easily conceive of alternative arrangements providing functionality similar to this embodiment without any deviation from the fundamental principles or the scope of this invention. For example, even though the disclosed embodiment is directed to voice communications, the principles of the invention are equally applicable to data and video communications used in communications switching systems or computer networks.

I claim:

1. A method of completing a telephone call, the method comprising the steps of:

receiving in a communications network a telephone number dialed by a caller to request a database-queried communications service, said telephone number being the only telephone number translatable to at least one POTS number;

translating the received telephone number to said at least one POTS number;

completing the call to a subscriber's telephone set associated with the said at least one POTS number; and delivering to a monitor associated with said telephone set information indicative of said translation.

2. The method of claim 1 wherein said telephone number dialed by the caller is a pay-per-call service telephone number.

3. The method of claim 1 wherein said telephone number dialed by the caller is a freephone service telephone number.

4. The method of claim 1 wherein said delivering step includes the step of:

routing said information indicative of said translation via a channel that is different from the channel over which the call is routed.

5. The method of claim 1 wherein said information indicative of said translation is delivered to said monitor between a first ringing signal and a second ringing signal applied to said telephone set.

6. The method of claim 1 wherein said delivering step includes the step of:

cryptographically authenticating the information indicative of said translation.

7. A method of completing a telephone call to a subscriber, the method comprising the steps of:

receiving in a communications network a telephone number dialed by a caller to request a database-queried communications service, said telephone number being translatable to a single POTS number;

translating the received telephone number to the POTS number;

cryptographically authenticating information indicative of said translation by including a secret key in a calculation of said authentication information, the secret key being known only to the subscriber and a communication carrier which translated the dialed number; and completing the call to a subscriber's telephone set associated with the POTS number while delivering to a monitor associated with said telephone set said cryptographic information indicative of said translation.

8. A method of completing a telephone call to a subscriber, the method comprising the steps of:

receiving in a communications network a telephone number dialed by a caller to request a database-queried communications service, said telephone number being translatable to a single POTS number;

translating the received telephone number to the POTS number;

cryptographically authenticating information indicative of said translation by including in said authenticated information a digital signature of a communication carrier which translated the dialed number;

completing the call to a subscriber's telephone set associated with the POTS number while delivering to a monitor associated with said telephone set said cryptographic information indicative of said translation.

9. A system for completing a telephone call, the system comprising:

a communications network which receives a telephone number dialed by a caller said telephone number being the only telephone number translatable to a single POTS number;

a database of said communications network which translates the received telephone number to said POTS number; and a switch of said communications network which a) completes the call to a subscriber's telephone set associated with the POTS number and delivers to a monitor associated with said telephone set information indicative of said translation.

10. The system of claim 9 wherein said telephone number dialed by the caller is a pay-per-call service telephone number.

11. The system of claim 9 wherein said telephone number dialed by the caller is a freephone service telephone number.

12. The system of claim 9 wherein said switch delivers said information indicative of said translation via a channel that is different from the channel over which the call is completed.

13. The system of claim 9 wherein said information indicative of said translation is delivered to said monitor between a first ringing signal and a second ringing signal applied to said telephone set.

14. A system for completing a telephone call, the system comprising:

a communications network which receives a telephone number dialed by a caller, said telephone number being the only telephone number translatable to a single POTS number;

a database of said communications network which translates the received telephone number to said POTS number and cryptographically authenticates information indicative of said translation; and a switch of said communications network which a) completes the call to a subscriber's telephone set associated with the POTS number and delivers to a monitor associated with said telephone set said cryptographic information that is indicative of said translation, and that is received from said switch.

15. The system of claim 14 Wherein said database includes a secret key in a calculation of said authentication information, the secret key being known only to the subscriber and a communication carrier which translated the dialed number.

16. The system of claim 14 wherein said database includes in said authenticated information a digital signature of a communication carrier which translated the dialed number.

* * * * *